United States Patent [19]

Plum

[11] Patent Number: 4,968,729
[45] Date of Patent: Nov. 6, 1990

[54] ELECTRODEPOSITABLE PREPARATIONS HAVING LOW ORGANIC SOLVENT CONTENT, AND PROCESSES FOR THE PREPARATION THEREOF

[75] Inventor: Helmut Plum, Taunusstein, Fed. Rep. of Germany

[73] Assignee: Hoechst AG, Fed. Rep. of Germany

[21] Appl. No.: 340,904

[22] Filed: Apr. 20, 1989

Related U.S. Application Data

[63] Continuation-in-part of Ser. No. 8,287, Jan. 29, 1987, abandoned.

[30] Foreign Application Priority Data

Jan. 31, 1986 [DE] Fed. Rep. of Germany ....... 3602980

[51] Int. Cl.$^5$ ................... C08G 18/32; C08G 18/58
[52] U.S. Cl. .................................. 523/340; 523/414; 523/418; 524/901
[58] Field of Search .............. 523/414, 340, 418; 524/901

[56] References Cited

U.S. PATENT DOCUMENTS 4,600,485 7/1986 Patzschke ................. 523/414 X

Primary Examiner—C. Warren Ivy
Attorney, Agent, or Firm—Bierman and Muserlian

[57] ABSTRACT

Electrodepositable stable coating preparation essentially comprising a synthetic resin (A), which contains amino groups and, if appropriate, hydroxyl groups, a hardener (B) which is capable of transesterification and/or transamidation, water as diluent (C), if appropriate, organic solvents (D), and also the conventional coating additives and, if appropriate, hardening catalysts (E), wherein the organic solvents content is a maximum of 10% by weight, relative to the solids content.

The invention furthermore relates to a process for the preparation of this coating preparation, which is distinguished by a low organic solvents content with good storage stability.

17 Claims, No Drawings

ELECTRODEPOSITABLE PREPARATIONS HAVING LOW ORGANIC SOLVENT CONTENT, AND PROCESSES FOR THE PREPARATION THEREOF

PRIOR APPLICATION

The present application is a continuation-in-part of copending U.S. patent application Ser. No. 008,287 filed Jan. 29, 1987, now abandoned.

Processes for the preparation of cathodically depositable coating preparations which contain binders which cross-link at low temperatures are described, for example, in German Patent Application No. P 3,602,981.5 (title: "Hardening components for synthetic resins which contain groups which are capable of forming amides or esters with carboxylic acids"), filed on the same day, Austrian Patent Application No. 1602/85 (title: "Process for the preparation of cross-linking components for coating binders"), and German Offenlegungsschriften No. 3,315,469 and No. 3,417,441. These binders consists of amino group-containing synthetic resins which, if appropriate, contain additional OH groups, and of the hardener for these synthetic resins. The amino groups may be primary, secondary or tertiary. In order to prepare the coating preparations, the synthetic resins and hardeners, present in organic solvents, are mixed and their amino groups are entirely or partially neutralized by reaction with a water-soluble acid. The mixture is subsequently diluted with water.

The organic solvents in which the synthetic resins are present are water-soluble and generally have a boiling point of about 100° C., for example diethylene glycol monomethyl or dimethyl ether or propylene gycol monomethyl or dimethyl ether. Their presence is necessary during the preparation of the synthetic resins. Thus for, example, polymers of $\alpha,\beta$-unsaturated monomers can only be prepared in solution, it only being possible to achieve low molecular weights by polymerization at elevated temperatures. The preparation of suitable polymers by polymer-analogous reaction also only succeeds in solvents at elevated temperature. The epoxide resins, which are solid at room temperature, must be dissolved in organic solvents before reaction with compounds containing amino groups and, if appropriate, also acid groups.

A disadvantage of the process used hitherto is the relatively high proportion of organic solvents in the cathodically depositable coating preparations prepared therefrom. It is generally between 3 and 10% by weight at a solids content of the bath of 15 to 20% by weight, i.e., the organic solvents content, relative to the solids content, may be up to 50 to 60% by weight.

There is great interest in reducing the proportion of organic solvents so that the electrodepositable coating preparation is virtually free of solvents, possibly apart from small proportions which have a favorable effect on the reduction of the film-formation temperature. Although the removal of the solvents by distillation from the synthetic resin and the hardener in separate operations and the preparation of aqueous dispersions which are stable over a relatively long period have succeeded, sedimentation or floating, or both effects simultaneously, occur, however, after a short time on mixing the synthetic resin and the hardener dispersions. However, the synthetic resin and hardener can also not be mixed before the dilution with water since the synthetic resins are solid or very viscous at room temperature. Liquefaction by increasing the temperature is likewise ruled out since the cross-linking reaction starts above 40° to 50° C.

The invention therefore has the object of providing an electrodepositable coating preparation, based on the reactive components mentioned above, which has a particularly low organic solvents content, in which no reaction has yet occurred between the components, and which also exhibits no sedimentation and/or floating on storage for a number of weeks.

The invention therefore relates to an electrodepositable, stable coating preparation essentially comprising a synthetic resin (A) which contains amino groups and, if appropriate, hydroxyl groups, a hardener (B) which is capable of transesterification and/or transamidation, water as diluent (C), if appropriate, organic solvents (D), and also the conventional coating additives and, if appropriate, hardening catalysts (E), wherein the organic solvents content is a maximum of 10% by weight, preferably a maximum of 7.5% by weight, and particularly 2.0 to 7.0% by weight, relative to the total solids content. This term shall include pigments and other solid additives, if any; it is normally determined at 180° C./0.5 h according to DIN 52316.

The invention furthermore relates to a process for the preparation of these electrodepositable paint preparations with the feature that the resin (A) and, if appropriate, also the hardener (B) are initially, separately, substantially freed of solvent, the residue remaining is diluted with a water-soluble solvent having a boiling point below 100° C., and subsequently the resin (A) and hardener (B) are mixed at a batch temperature at which the components do not react, whereupon the amino groups present are partially or completely neutralized using a water-soluble acid, the batch is additionally diluted with water, and the organic solvents are removed from the aqueous dispersion under reduced pressure at slightly elevated temperature.

Cationic resins such as have already been described in great number in the literature, are employed as compounds (A). The requirement for their possible use is a number of basic groups, such as primary, secondary or tertiary amino groups, which is sufficient to ensure perfect dilutability with water. If these resins (A) contain primary and/or secondary amine groups then they may or may not contain also hydroxyl groups and preferably they do. If only tertiary amino groups are present in (A), then (A) must contain them in order to enable cross-linking by the hardener (B) via transesterification. The amino equivalent weight is expediently 150 to 3000, preferably 500 to 2000. The hydroxyl equivalent weight of the resins, if they have OH groups, is generally between 150 and 1000, preferably 200 to 500. In addition, the resins may contain C=C double bonds, the C=C equivalent weight preferably being 500 to 1500.

The molecular weight (mean weight) of these synthetic resins (A) is usually in the range from about 300 to about 50,000, preferably about 5000 to about 20,000.

Examples of such synthetic resins (A) are described in the Journal of Coatings Technology, Vol. 54, No. 686, (1982), p. 33 to 41 ("Polymer Compositions for Cationic Electrodepositable Coatings"), to which reference is made here. Polymers of $\alpha,\beta$-olefinically unsaturated monomers which contain hydroxyl and/or amino groups may be mentioned here. The hydroxyl or amino groups may be introduced using appropriate monomers in the copolymerization, for example by means of hydroxyl or amino esters of α,β-olefinically unsaturated carboxylic acids, such as hydroxyalkyl (meth)-acrylates or aminoalkyl (meth)acrylates, or by polymeranalogous reaction with diamines or polyamines, for example with N,N-dimethylaminopropylamine, with formation of amide, amino or urethane groups. The polyaminopolyamides, which can be obtained from dimerized fatty acids and polyamines, are a further group. Aminopolyether polyols, which are accessible by reaction of primary or secondary amines with a polyglycidyl ether, are particularly suited for this. Sufficient epoxide groups to convert all amino groups into tertiary amino groups should expediently be present here. The preferred polyglycidyl ethers are polyglycidyl ethers of bisphenol A and similar polyphenols. They can be prepared, for example by etherifying a polyphenol using an epihalohydrin, such as epichlorohydrin, in the presence of alkali.

The polyglycidyl ethers of the polyphenols may be reacted as such with the amines, but it is frequently advantageous to react some of the reactive epoxide groups with a modified material in order to improve the film properties. The reaction of the epoxide groups with a polyol or a polycarboxylic acid is particularly preferred. The following may be used here as polyols:

Polyether polyols, which are prepared by addition polymerization of alkylene oxides (for example ethylene oxide, propylene oxide, tetrahydrofuran) with low-molecular-weight polyols having 2 to 8 carbon atoms and a molecular weight of about 50 to 300 (for example ethylene glycol, diethylene glycol, propylene glycol, dipropylene glycols, glycerol, trimethylolpropane, 1,2,6-hexanetriol, pentaerythrite). If ethylene oxide is used alone or in combination with other alkylene oxides as alkylene oxide components, the water-solubility of the synthetic resin (A) is improved;

polyester polyols, which are prepared by reaction of the above mentioned low-molecular weight polyols or epoxy compounds, for example fatty acid glycidyl esters, with polycarboxylic acid (for example adipic acid, succinic acid, maleic acid, phthalic acid, or terephthalic acid), or derivatives thereof;

polyester polyols which are prepared by ring-opening polymerization of a cyclic ester, such as caprolactone or butyrolactone;

urethane-modified polyls which are obtained by reaction of an excess of the abovementioned polyether polyols or polyester polyols with an organic polyisocyanate.

The abovementioned polycarboxylic acids are obtained by reaction of the polyols described above with an excess of polycarboxylic acids or, preferably, the anhydrides thereof. They can likewise be obtained by esterification of polycarboxylic acids, or anhydrides thereof, using low-molecular weight polyols, such as ethylene glycol, propylene glycol, etc. Low-molecular weight polyether polyamines or polyamines, such as, for example, hexamethylenediamine, may also be employed in place of the low-molecular weight polyols.

The modification of the aminopolyether polyols using polyols or polycarboxylic acids is preferably carried out before the reaction of the polyglycidyl ethers with the primary or secondary amaines. However, it is also possible to select the ratio of the polyglycidyl ether used as starting material to the amines in such a fashion that an excess of epoxy groups is present. The epoxy groups may then be reacted with the polycarboxylic acids or polyols. It is furthermore possible to further modify, the final product, which no longer contains epoxide groups, by reaction of the hydroxyl groups with glycidyl ethers.

The terminal and/or pending ester groups which the hardener (B) contains are substantially stable in neutral aqueous media, but in the alkaline medium of the deposited film they react with the primary/secondary amine groups and/or the hydroxyl groups of resin (A) under the curing conditions, i.e., normally temperatures above 120° C., preferably 130° to 180° C. and times longer than 0.3 h, preferably 0.5 to 1 h, via transamidation and/or transesterification. The reactivity of the ester groups can be increased by using lower ester alcohols and/or by increasing the electrophilic activity of the carboxyl group by suitable substituents.

As hardener (B), Michael-addition products may be employed, for example, such as are described in German Offenlegungsschriften No. 3,315,469; No. 3,417,441 and No. 3,602,981. Other hardeners also applicable in the coating compositions of the invention are disclosed in German Offenlegungsschriften No. 3,103,642 and No. 3,315,469 as well as in European Offenlegungsschriften Nos. 12,463 and 82,201. Compounds which contain the structural element of the formula

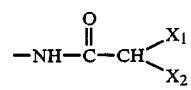    I in which $X_1$ and $X_2$ represent $CO_2R$, $CN$ or

and R denotes an alkyl radical preferably having 1 to 8 carbon atoms, are likewise suitable.

Such compounds may be prepared, for example, by reaction of a diisocyanate with a CH-acidic carbonyl compound of the formula $CH_2X_2$ and with polyols, polyaminoalcohols or polyamines, and are published, for example, in Austrian Patent Application No. 1602/85. With this, reference is made to the above-mentioned literature, including the preferred embodiments described therein. The hardeners (B) are generally present as solutions containing 60 to 80% by weight of solids. The solvent component can be removed from them by the same method as in the case of the synthetic resin (A). Depending on the solids content and concentration of (B) in the coating preparation, the removal of the solvent may be omitted, if appropriate.

The synthetic resin (A) and the hardener (B) are generally mixed in amounts such that the ratio of the sum of the groups which are capable of ester and/or amide formation in the synthetic resin to the sum of the groups which are capable of transesterification and/or transamidation and the double bonds optionally present in the hardener is 10:1 to 1:10, preferably 3:1 to 1:3. The amounts here should be selected so that an adequate cross-linking density of the coatings results and the latter have a good solvent resistance and high flexibility. In general, this is achieved at a ratio of parts by weight of synthetic resin (A) and hardener (B) (in each case solid) in the range from 90:10 to 30:70, preferably 50:50 to 80:20.

The coating preparations according to the invention generally also contain the known additives, such as pigments, pigment pastes, antioxidants, surfactants, solvents, leveling and thickening agents, reactive thinners, etc, and also, if appropriate, hardening catalysts. Such additives are known and are conventionally employed in the coatings industry. Suitable catayts for the preparation are, for example, metal salts of organic acids, particularly zinc, lead, iron or chromium octoate or naphthenate. The catalysts also accelerate the cross-linking reactions of any double bonds which may be present in the hardener molecule. The amount of these catalysts is expediently between 0 and 10% by weight, preferably between 0.1 and 2.0% by weight calculated as the quantity by weight of metal and relative to the total weight of synthetic resin and hardener.

In the process according to the invention, the organic solvent is substantially removed from the resin (A) and, if appropriate, from the hardener (B), preferably under reduced pressure in the range from 20 to 130 mbar and at the lowest possible temperature, preferably below 100° C. In general, it is sufficient here to remove the solvent to a solids content of 90 to 95% by weight. Dilution is then effected by addition of a water-soluble solvent having a boiling point of less than 100° C., and the resin (A) is mixed with the hardener (B) at a temperature of preferably below 40° C. After the neutralization of the amino groups, if appropriate only partially, using a water-soluble acid and the additional dilution with water, the organic solvent is removed from the aqueous dispersion under reduced pressure at a maximum temperature of preferably 40° C. Dilution with water can subsequently again be effected. In this fashion, aqueous dispersions are obtained which are stable for several months, to be precise at least 6 months, without addition of further substances, for example emulsifiers.

The dilution of the concentrated resin solution or hardener solution with the water-dilutable solvents having a boiling point of below 100° C., preferably below 80° C., is generally carried out by adding the solvent slowly to the still hot, highly-concentrated resin solution, and cooling the latter to the boiling point of the respective solvent employed. The batch is then stirred at this temperature until a homogeneous mixture is produced. Solvents which may be employed are lower alcohols and ketones, for example methanol, ethanol, isopropanol, acetone and methyl ethyl ketone. In general, a solids content of the solution of more than 50, preferably more than 60%, by weight is produced. The resultant mixture is mixed with the hardener (B) at a temperature at which the components do not react, for example below 40° C.

Partial or complete neutralization of the amino groups which are present in the case of the cathodically depositable coating may be carried out using water-soluble acids before dilution with water. However, the water-soluble acid may alternatively be mixed completely or partially before the dilution with the water required, so that the neutralization is not carried out until during the dilution. In general, only sufficient acid is added so that the bath has the stability necessary and precipitations do not occur. Suitable acids are, for example, formic acid, acetic acid, lactic acid and phosphoric acid.

In general, sufficient water is added so that the dispersion has a solids content of more than 20, preferably more than 30% by weight.

The removal of the organic solvent from the aqueous dispersion is then preferably carried out under reduced pressure at 20 to 70 mbar, and at temperatures such that the components cannot react. In general, this process is carried out at a maximum temperature of 40° C., preferably 30° C. A water-solvent mixture, from whose composition the residual contents of organic solvents in the aqueous dispersion is determined, is removed here by distillation.

The electrodeposition of the coating preparations according to the invention is carried out by known processes, reference being made to these here. The deposition may be carried out on all electrically conducting substrates, for example metal, such as steel, copper, aluminum and the like. Electro-dip coatings may here be present as clear coatings or as pigmented preparations.

In the following excamaples, P and % always denote parts by weight and percent by weight respectively. The solids content was determined at 180° C./0.5 H.

EXAMPLE 1

(a) Preparation of the synthetic resin (A)

An aminopolyether polyol was prepared by known methods from 65.5% of a bisphenol A epoxy resin having an epoxy equivalent weight of 480, 18.8% of a polyester of trimethylolpropane, adipic acid, isononanoic acid and tetrahydrophthalic anhydride having an acid index of 65 mg of KOH/g and a hydroxyl index of 310 mg of KOH/g, 6.1% of diethanolamine, 4.4% of 2-ethylhexylamine and 5.2% of diethylaminopropylamine. The reaction of the epoxy resin with the polyester was carried out at 130° C. until an epoxy equivalent weight of about 620 (or a solid resin) was attained. For the further reaction, the amines were initially introduced and the product of the reaction of epoxy resin and polyester was added at 80° C. The reaction was ended when an epoxide index of approximately 0 was attained. The product existed as a 65% solution-in propylene glycol monoethyl ether and had an amine index of 96 mg of KOH/g.

(b) Preparation of the hardener (B)

2160 P of hydroxyethyl acrylate having an acid index of 1 and 3.8 P of zinc acetylacetonate were placed in a reactor and heated to 60° C., 1636 P of toluylene diisocyanate were slowly added dropwise, and the mixture was kept at 60° C. until the content of $-N=C=O$ groups was less than 0.2%. 15 P of hydroquinone and 844 P of ethylene glycol monohexyl ether were subsequently added. An 80% strength clear resin solution containing 9.5% of double bonds were obtained.

1016 P of this precursor and 10 P of KOH, 30% strength in methanol, were placed in a reactor and heated to 80° C. and 132 P of dimethyl malonate were slowly added dropwise at such a rate that 80° C. was not exceeded. The mixture was kept at this temperature until the content of $-C=C-$ double bonds had fallen to 4.2%. The reaction mixture was then diluted with ethylene glycol monohexyl ether to a solids content of 80%, and 2 P of acetic acid were added. A yellowish resin solution was obtained.

(c) Aqueous synthetic resin/hardener dispersion

From 3528 P of the solution of the above aminopolyether polyol, 1036 P of propylene glycol monomethyl ether were removed by distillation under reduced pressure at 90° to 110° C., and 784 P of ethanol were slowly added at 90° C. The mixture cooled to 78° C. during this, and was stirred at this temperature until a homogeneous mixture was produced. The mixture was subsequently cooled to 30° C., and 1229 P of the hardener solution and 106 P of lead octoate were added successively. After the mixture had become homogeneous, it was transferred into a solution of 59 P of formic acid (85% strength) in 6610 P of deionized water. 2227 P of a mixture of water, ethanol and a little propylene glycol monomethyl ether and ethylene glycol monohexyl ether were removed from the approximately 31% strength aqueous dispersion by distillation under reduced pressure of about 40 mbar at 35° to 40° C. 9053 P of a 37% strength aqueous dispersion were obtained which, according to analysis by gas chromatography, still contained 0.6% of ethanol, 0.4% of propylene glycol monomethyl ether and 1.4% of ethylene glycol monohexyl ether.

(d) Electro-dip coating and application testing 13.7 P of $TiO_2$, 1.2 P of lead silicate and 0.1 P of carbon black were added to 43 P of the 37% strength aqueous binder/hardener dispersion, the mixture was comminuted in a bead mill, and a further 79 P of the 37% strength aqueous dispersion were subsequently added to the batch. The batch was then diluted with deionized water using a stirrer at high speed until the solids content was 20%. The coating bath was stirred for 24 hours and then had the following characteristics: Organic solvents content, relative to the solids content: 4.8% by weight; pH 5.8; conductivity 1740 $\mu Scm^{-1}$; meq value 40. It is stable for at least 6 months. After deposition for 2 minutes at 300 V at a bath temperature of 28° C. and hardening (30 minutes, 163° C.) on a phosphated steel sheet, connected as the cathode, a smooth coating having a film thickness of 20 $\mu$m, a solvent resistance of more than 100 double strokes with acetone and a value of 80 cm in the Niessen reverse impact test is obtained.

What I claim is:

1. A process for the preparation of an electrodepositable coating preparation consisting essentially of a synthetic resin (A), which contains amino groups and hydroxyl groups when said amino groups are tertiary, a hardener (B) containing ester groups capable of transamidation and/or transesterification, water as diluent (C), and also the conventional coating additives wherein the organic solvents content is a maximum of 10% by weight, relative to the total solids content, the weight ratio of (A) to (B) is 10:1 to 1:10, wherein the resin (A) is substantially freed of solvent, the residue remaining is diluted with a water-soluble solvent having a boiling point of below 100° C., and the resin (A) is subsequently mixed with the hardener (B) at a batch temperature such that the components do not react, whereupon the amino groups present are neutralized, partially or completely, using a water-soluble acid, the batch is additionally diluted with water, and the organic solvent is removed from the aqueous dispersion under reduced pressure at slightly elevated temperature.

2. The process as claimed in claim 1, wherein lower alcohols or ketones are employed as water-soluble solvents.

3. The process as claimed in claim 2, wherein methanol, ethanol, isopropanol, acetone or methyl ethyl ketone are employed.

4. The process as claimed in claim 1, wherein the hardener is added at a temperature up to 40° C. and the organic solvent is removed from the aqueous disperion at a maximum of 40° C.

5. The process as claimed in claim 1, wherein formic acid, acetic acid, lactic acid or phosphoric acid are employed as water-soluble acids.

6. The process of claim 1 wherein hardener (B) is also substantially free of solvents.

7. An electrodepositable, stable coating composition produced by the process of claim 1.

8. The electrodepositable coating preparation as claimed in claim 7, wherein the organic solvents content is a maximum of 7.5% by weight, relative to the solids content.

9. The electrodepositable coating preparation as claimed in claim 7, wherein it is cathodically depositable, and the synthetic resin (A) additionally contains C≡C double bonds.

10. A coating preparation as claimed in claim 7, wherein polymers of $\alpha,\beta$-olefinically unsaturated monomers having hydroxyl and/or amino groups, polyamino-polyamides of dimerized fatty acids, and polyamines or aminopolyether polyols, obtained by reaction of epoxy resins with primary or secondary amines, are employed as compounds (A).

11. A coating preparation as claimed in claim 7, wherein Michael addition products or compounds which contain the structural elements of the formula

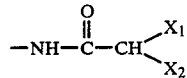

I in which $X_1$ and $X_2$ represent $CO_2R$, CN or

and R denotes an alkyl radical having 1 to 8 carbon atoms, are employed as hardener (B).

12. A coating preparation as claimed in claim 7, wherein the weight ratio of synthetic resin (A) to hardener (B) (in each case solid) is 90:10 to 30:70.

13. A coating preparation as claimed in claim 7, wherein metal salts of organic acids serve as hardening catalysts.

14. A coating preparation as claimed in claim 13, wherein the hardening catalysts are zinc, lead, iron or chromium octoate or naphthenate.

15. A coating preparation of claim 7 containing a hardening catalyst (E).

16. The coating preparation of claim 7 wherein the resin (A) also contains hydroxy groups.

17. The coating preparation of claim 7 also containing organic solvents (D) up to a maximum of 7.5% by weight based on the total solids content.

* * * * *